(12) United States Patent
Koch

(10) Patent No.: US 10,265,777 B2
(45) Date of Patent: Apr. 23, 2019

(54) SPACER FOR ARBOR OF MACHINING SYSTEM, MACHINING SYSTEM INCORPORATING SAME, AND ASSOCIATED METHOD

(71) Applicant: Loyd L. Koch, Rockford, IL (US)

(72) Inventor: Loyd L. Koch, Rockford, IL (US)

(73) Assignee: Bourn & Koch, Inc., Rockford, IL (US)

( * ) Notice: Subject to any disclaimer, the term of this patent is extended or adjusted under 35 U.S.C. 154(b) by 0 days.

(21) Appl. No.: 15/664,865

(22) Filed: Jul. 31, 2017

(65) Prior Publication Data
US 2019/0030615 A1  Jan. 31, 2019

(51) Int. Cl.
| | |
|---|---|
| *B23F 5/12* | (2006.01) |
| *B23B 29/22* | (2006.01) |
| *B23F 5/22* | (2006.01) |
| *B23F 23/12* | (2006.01) |

(52) U.S. Cl.
CPC .............. *B23B 29/22* (2013.01); *B23F 5/22* (2013.01); *B23F 23/1243* (2013.01); *B23B 2260/004* (2013.01); *B23B 2260/124* (2013.01); *Y10T 409/10159* (2015.01); *Y10T 409/309632* (2015.01)

(58) Field of Classification Search
CPC .... B23F 5/22; B23F 23/1237; B23F 23/1243; Y10T 409/309632; Y10T 409/10159
See application file for complete search history.

(56) References Cited

U.S. PATENT DOCUMENTS

| | | | | |
|---|---|---|---|---|
| 2,435,396 | A * | 2/1948 | Koch | B23B 31/026 220/327 |
| 2,714,838 | A * | 8/1955 | Scone | B23F 23/1243 409/14 |
| 2,733,073 | A * | 1/1956 | Phillips | B23B 31/36 279/158 |
| 2,833,544 | A * | 5/1958 | Blades | B23B 31/36 279/16 |
| 4,666,353 | A * | 5/1987 | Micek | B23B 31/36 279/158 |
| 5,048,384 | A * | 9/1991 | Carlen | B23B 31/026 82/170 |
| 5,427,484 | A * | 6/1995 | Galli | B23B 31/026 279/133 |
| 5,971,682 | A * | 10/1999 | Vig | B23B 31/026 279/6 |
| 6,568,883 | B1 * | 5/2003 | Fukui | B23B 29/046 408/1 R |
| 7,165,923 | B2 * | 1/2007 | Matsumoto | B23B 31/026 408/153 |
| 2015/0239054 | A1* | 8/2015 | Maringer | B23F 23/1243 407/25 |

* cited by examiner

*Primary Examiner* — Daniel Howell
(74) *Attorney, Agent, or Firm* — Reinhart Boerner Van Deuren P.C.

(57) ABSTRACT

A spacer for gear hobbing machine, a gear hobbing machine incorporating same, and an associated method are provided. The spacer includes a bore. One or more adjustment members are carried by the spacer and adjustable into and out of the bore. Adjustment of the adjustment members allows for varying the position of the spacer when mounted on an arbor of the gear hobbing machine.

18 Claims, 8 Drawing Sheets

SPACER FOR ARBOR OF MACHINING SYSTEM, MACHINING SYSTEM INCORPORATING SAME, AND ASSOCIATED METHOD

FIELD OF THE INVENTION

This invention generally relates to machining, more particularly to tooling associated with machining operations.

BACKGROUND OF THE INVENTION

Contemporary machining involves rotating a cutting tool to remove material from a work piece. One readily known configuration involves using a cutting tool mounted on a rotatable arbor of a machining system. The arbor and cutting tool are keyed such that rotation of the arbor results in a like rotation of the cutting tool. The cutting tool is brought into cutting engagement with the workpiece which is itself mounted in a fixture. Examples of such machining systems are mills, lathes, gear cutting machines such as gear hobbing machines, etc.

It is often times necessary to axially locate the cutting along the length of the arbor to ensure that the cutting tool is at the desired axial location along the arbor for cutting. Further, it is not uncommon to utilize several cutting tools on a single arbor. As one example, a first cutting tool may be used for a rough cut, while a second cutting tool may be used for a finishing cut. In this case, each of the cutting tools must be axially located along the arbor in a known location so that the cutting operation may be achieved.

Axially locating the cutting tool on the arbor is typically done via spacers. One or more of these spacers may be situated on one or both sides of the cutting tool to locate the same in the appropriate axial position along the arbor. However, it has been found by the Applicant herein that after installing the cutting tools and the spacers on the arbor, a deflection in the arbor occurs, causing the cutting tool to deviate from its desired location. This deviation is referred to as "run out" and can lead to undesirable imprecision in machining. While there are generally several mechanisms which contribute to such run out, generally, the same occurs due to the tension placed on the arbor. Indeed, the arbor includes a nut at one end thereof which is tightened after installing the cutting tools and spacers thereon. This tightening places the arbor in tension, while at the same time compressing the spacers and cutting tool against one another. This leads to a deflection in the arbor, and consequently a deflection affecting the theoretical location of the cutting tool.

Unfortunately, the known means for dealing with run out is highly inefficient. One methodology is to run an indicator on one or more axial faces of the cutting tool as it rotates with the arbor to identify which direction the arbor is deflected. Thereafter, an operator will stop the rotation of the arbor, and use a hammer and chisel type tool to attempt to force the arbor back into its desired non-deflected state. This is an extremely time intensive process as it requires repeated iterations of using the indicator to identify where there is a deviation in the position of the cutting tool, then stopping the machine, then hammering, then repeating. Such a process significantly slows down production and leads to highly undesirable set up times.

As such, there is a need in the art for a spacer, a machining system utilizing such a spacer, and related methods which overcome these shortcomings described above. The invention provides as much. These and other advantages of the invention, as well as additional inventive features, will be apparent from the description of the invention provided herein.

BRIEF SUMMARY OF THE INVENTION

In one aspect, a spacer for an arbor of a machining system is provided. An embodiment of such a spacer includes a cylindrical body having a bore therethrough. The body defines an axis in an axial direction. The bore has a first portion at a first diameter and a second portion at a second diameter less than the first diameter. A plurality of adjustment members extend through the cylindrical body and are in communication with the bore. Each one of the plurality of adjustment members is movable in a radial direction.

In certain embodiments, the plurality of adjustment members are extendable into the first portion of the bore. A step is formed between the first portion and the second portion. The first portion has a first axial length and the second portion has a second axial length, the second axial length less than the first axial length.

In certain embodiments, each one of the plurality of adjustment members is movable within an associated adjustment member bore. Each adjustment member bore is threaded. Each adjustment member of the plurality of adjustment members is a threaded set screw.

In certain embodiments, a biasing member is situated within each adjustment member bore and is arranged to bias the threaded set screw associated with the adjustment member bore.

In certain embodiments, the plurality of adjustment members includes three adjustment members. The plurality of adjustment members are equally spaced in a circumferential direction of the spacer.

In certain embodiments, at least one of the plurality of adjustment members is axially spaced from remaining ones of the plurality of adjustment members.

In another aspect, a machining system is provided. An embodiment of such a machining system includes a frame. An arbor is rotatably mounted to the frame. The arbor is rotatable about an arbor axis. A spindle is rotatably mounted to the frame. The spindle is rotatable about a spindle axis. The spindle axis is transverse to the arbor axis. The machining system according to this embodiment also includes at least one cutting tool mounted to the arbor as well as at least one spacer mounted to the arbor. The at least one spacer includes a cylindrical body having a bore extending through the body. The bore defines a spacer axis. A plurality of adjustment members are carried by the body. The plurality of adjustment members are movable into and out of the bore in a direction perpendicular to the spacer axis.

In certain embodiments, the at least one spacer includes a plurality of spacers. The hob is interposed on the arbor between two adjacent spacers.

In certain embodiments, at least two spacers of the plurality of spacers have axial lengths which differ from one another.

In certain embodiments, each one of the plurality of adjustment members is movable within an associated adjustment member bore. Each adjustment member bore is threaded and wherein each adjustment member of the plurality of adjustment members is a threaded set screw.

In yet another aspect, a method for locating a cutting tool along an arbor of a machining system is provided. An embodiment according to this aspect includes installing a cutting tool on the arbor. This embodiment also includes installing at least one spacer on the arbor. The at least one spacer including a bore and a plurality of adjustment members movable into and out of the bore. This embodiment also includes rotating the arbor and simultaneously contacting a surface of at least one of the cutting tool and the at least one spacer to provide a first dimensional indication. This embodiment also includes adjusting at least one of the plurality of adjustment members of the at least one spacer.

In certain embodiments, the method also includes rotating the arbor and simultaneously contacting the surface of at least one of the cutting tool and the at least one spacer to provide a second dimensional indication arbor after adjusting the at least one of the plurality of adjustment members of the at least one spacer.

In certain embodiments, adjusting at least one of the plurality of adjustment members includes adjusting each one of the plurality of adjustment members. In certain embodiments, adjusting includes a moving the at least one adjustment member in a radial direction which is normal to an axis defined by a bore extending through the at least one spacer.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning now to the drawings, embodiments of a spacer, a machining system incorporating the spacer, and an associated method are shown and described. As will be understood from the following, the spacer advantageously allows for compensation of run out of a cutting tool, i.e. deviation of the cutting tool from its desired position as a result of arbor deflection. This compensation offered by the spacer allows for a substantial reduction in set up time of a machining operation. Indeed, each spacer may be quickly adjusted to ensure that the cutting tool does not vary to an undesirable extent when mounted on the arbor. As such, the spacer according to the teachings herein provides a quick and efficient way for reducing or eliminating run out. The spacers may be utilized on any machining system which utilizes an arbor for cutting tool mounting. As such, although an exemplary gear hobbing machine and gear hobbing operation are shown and described, the invention is not limited to only this type of machine and operation. A machining system according to the teachings herein incorporating such a spacer thus presents substantially faster set up times as it is no longer a requirement to manually use an iterative hammer and chisel operation as described above to reduce or eliminate run out.

Figure 1:
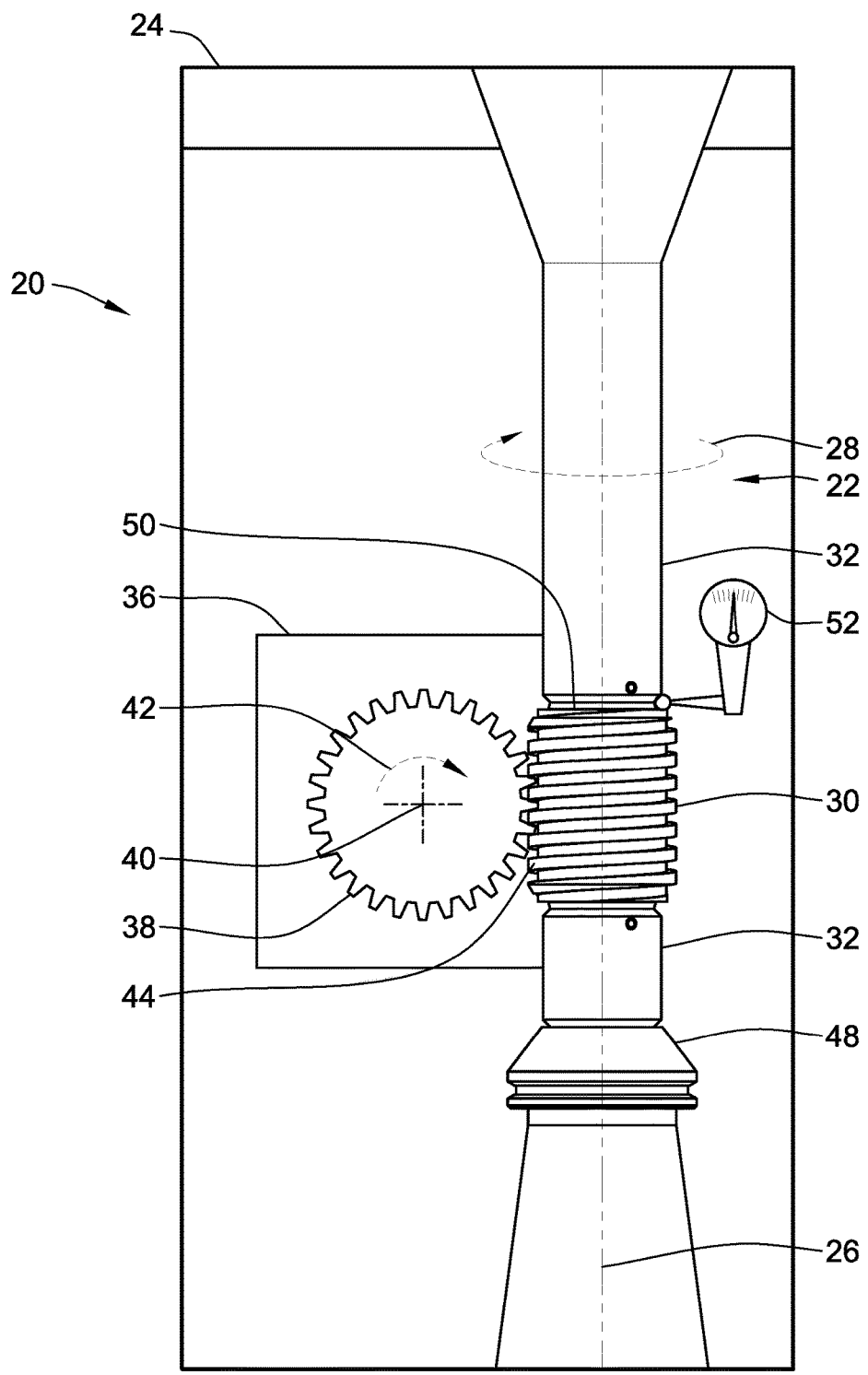
FIG. 1 is a generally schematic view of an embodiment of a machining system incorporating a plurality of spacers according to the teachings herein.

Turning now to FIG. 1, an exemplary embodiment of a gear hobbing machine 20 according to the teachings herein is illustrated. Gear hobbing machine 20 includes a rotatable arbor 22 mounted to a frame 24 of gear hobbing machine 20 and which is rotatable about an arbor axis 26 in direction 28 as illustrated. A cutting tool in the form of a hob 30 is mounted on arbor 22, and more particularly a shaft 48 thereof, and is utilized for cutting gear profiles during gear hobbing operations. One or more spacers 32 are also situated on arbor 22 and are utilized to accurately position hob 30 along shaft 48 as briefly introduced above.

A spindle 36 is also mounted to frame 24. Spindle 36 is rotatable about a spindle axis XL and direction 42 as illustrated. Spindle 36 carries a workpiece 38. As can be seen in the illustration, arbor axis 26 and spindle axis 40 are transverse to one another. Hob 30 includes a plurality of teeth 44 which cut corresponding features into workpiece 38 to ultimately form a gear or spline or the like. Although a single row of teeth 44 are illustrated, those of skill in the art will readily recognize that a typical hob 30 includes multiple rows of teeth such that cutting occurs continuously as the arbor 22 and spindle 36 rotate relative to one another. As such, the particular shape of hob 30 and size of hob is exemplary only. Indeed, spacers 32 are designed such that they can accommodate various hob sizes and shapes, and are thus not constrained to any particular hob.

Hob 30 and spacers 32 are installed by sliding the same axially onto and a long shaft 48 of arbor 22. It is conceived that multiple spacers 32 may be installed adjacent one another and/or may be installed such that hob 30 is interposed between spacers 32 as shown in the illustrated embodiment. It is also conceived that in certain embodiments only a single spacer 32 may be necessary. Still further, it is also conceived that spacers 32 may have varying axial lengths as illustrated. This variation in axial length allows an operator to select a particular combination of spacers 32 to accommodate the desired location of the cutting tool, i.e. the hob 30 in the exemplary illustration.

Once installed, arbor 22 may be rotated in direction 28 while simultaneously indicating against an axially facing surface of hob 30 using for example a dial indicator 52 as schematically shown. This allows the operator to identify any areas of run out of hob 30 as it rotates. Put differently, this allows an operator to identify any areas of the axial surface of hob 30 which deviate above or below a theoretical plane within which the relevant axial surface of the hob 30 should stay within. Once these areas or aberrations are identified, adjustment members of spacers 32 may be adjusted to ultimately affect the position of hob 30 on arbor 22 as it rotates to substantially reduce or eliminate this run out. The aforementioned adjustment in effect counteracts the deflection of arbor shaft 48 of arbor 22.

As stated above, the above configuration is exemplary only. A different machining system other than gear hobbing machine 20, such as a mill which also has an arbor, could also be utilized in the context of the invention. Likewise, a different cutting tool other than hob 30 could also be utilized, e.g. such as a milling tool for non-limiting example. As such, the invention is not limited to the illustrated exemplary embodiment of a gear hobbing machining system. Rather, spacers 32 may be employed with any machining system which utilizes a cutting tool mounted on an arbor.

Figure 2:
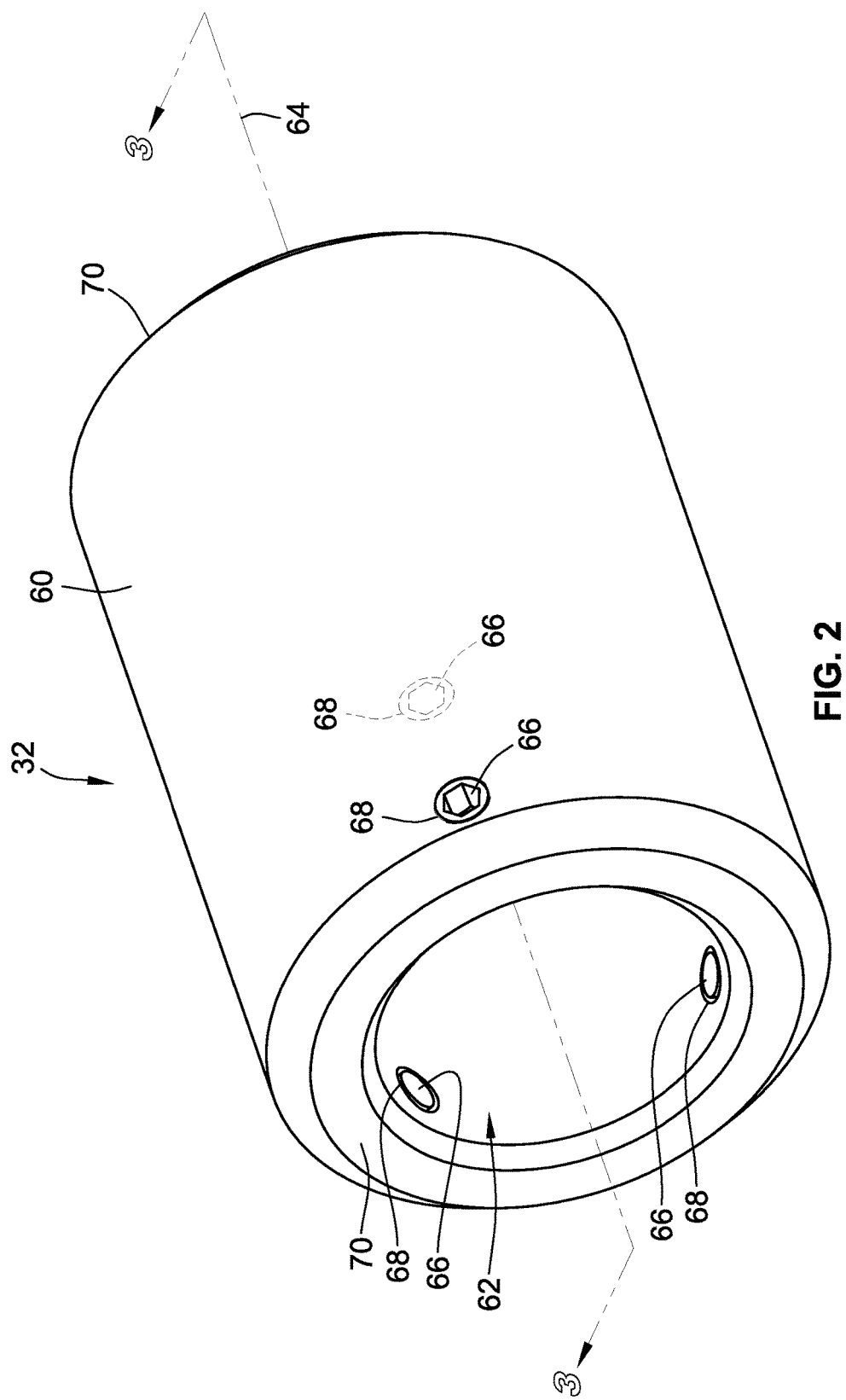
FIG. 2 is a perspective view of one of the spacers from FIG. 1.

Turning now to FIG. 2, an exemplary spacer 32 is shown. As stated above, the particular axial length of spacer 32 illustrated is not limiting on the invention. As may be surmised from FIG. 1, spacers 32 may be provided in various lengths. Spacer 32 includes a generally cylindrical body 60. A bore 62 extends through body 60 and defines a bore axis 64. As may also be seen in this view, spacer 32 is free of any keyways or keys. This has the advantage of a more uniform force distribution across spacer 32 when it is installed on arbor shaft 48 and arbor 22 is tightened.

A plurality of adjustment members 66 are carried by body 60. Each adjustment member 66 is contained within an associated adjustment member bore 68. Adjustment members 66 are movable within their respective adjustment member bores 68 into and out of bore 62. This adjustment of adjustment members 66 allows for the compensation for any dimensional aberrations in the axial surfaces 70 of spacer 32 which are situated to abut hob 30 (see FIG. 1) or another adjacent spacer 32. Further, such adjustment results in ultimately compensating for any run out which may be present with hob 30 in its installed state on arbor 22, as shown in FIG. 1.

In the illustrated embodiment, three adjustment members 66 are illustrated. Each adjustment member 66 has a longitudinal central axis. The central axes of the adjustment members 66 are coplanar. However, it is also conceived that at least one of the adjustment members 66 may be axially spaced from the remaining adjustment members 66. Indeed, it is conceived herein that any number of adjustment members 66 and associated adjustment member bores 68 may be utilized at any axial orientation along body 60, as well as any angular orientation relative to one another.

Figure 3:
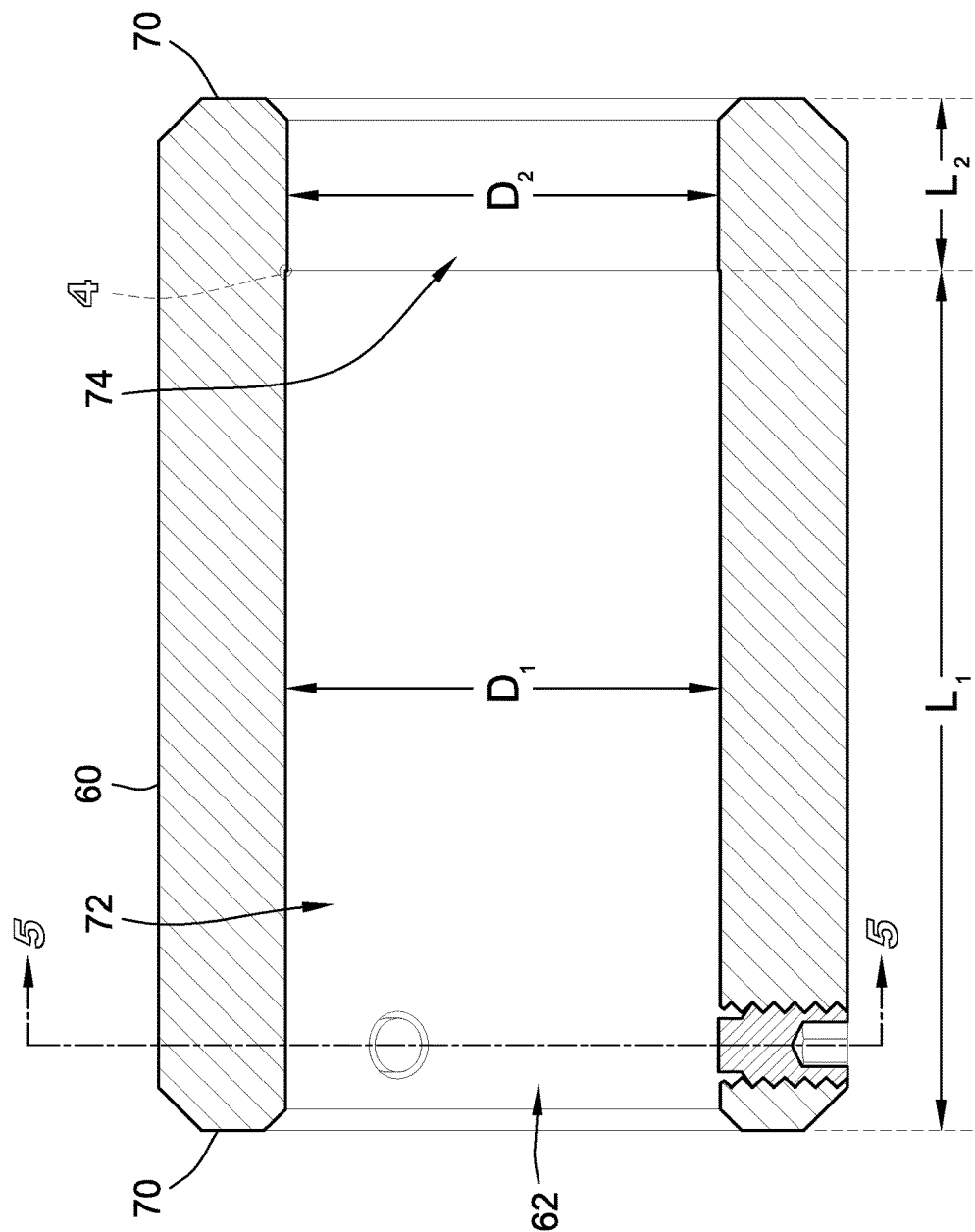
FIG. 3 is a cross section of the spacer shown in FIG. 2.

Turning now to FIG. 3, the same illustrates spacer 32 in a cross sectional view. Bore 62 has a first portion 72 at a first axial length $L_1$, and a second portion 74 at a second axial length $L_2$. As can be seen in the illustrated view, the axial length $L_1$ first portion 72 is greater than that of second portion 74. Additionally, first portion 72 of bore 62 has a first diameter $D_1$, while second portion 74 has a second diameter $D_2$. First diameter $D_1$, is greater than second diameter $D_2$. First diameter $D_1$ includes radial clearance from the known diameter of an arbor shaft 48. This clearance may for example be about 0.010 inches to about 0.030 inches. The term "about" is used to encompass ordinary machining tolerances for a diametrical measurement, as known to one of skill in the art. This clearance allows for movement of adjustment members 66 as described herein. Second diameter $D_2$ has minimal clearance relative to a typical diameter of an arbor shaft. This is done to reduce play between spacer 32 and arbor shaft 48.

Figure 4:
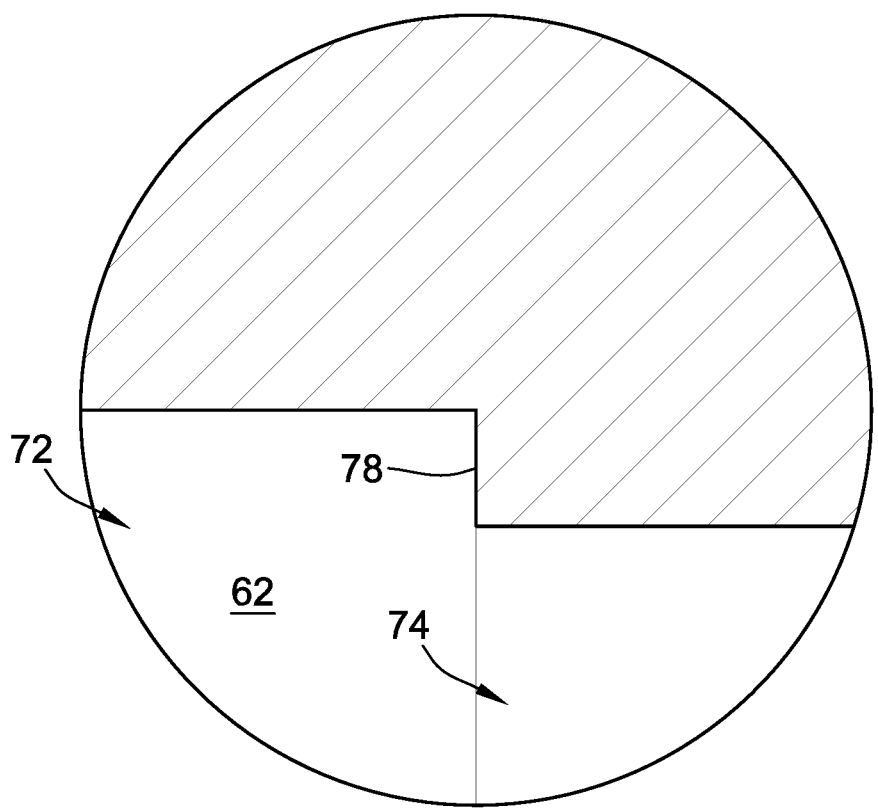
FIG. 4 is a partial view of the cross section of FIG. 3.

Turning now to FIG. 4, the same illustrates a partial view of the cross-section of FIG. 3 in the region of the transition between first portion 72 and second portion 74 of bore 62. As may be seen in this view, a step 78 is formed at this transition. The variation in the diameter of bore 62 between first portion 72 and second portion 74 allows for some clearance between shaft 48 of arbor 22 (see FIG. 1) and the interior surface of spacer 32. This clearance allows for some play between these components to allow for the aforementioned adjustment of spacer 32 using adjustment member 66. Despite this play, once all adjustment members 66 are adjusted, spacer 32 is tightly held on shaft 48.

Figure 5:
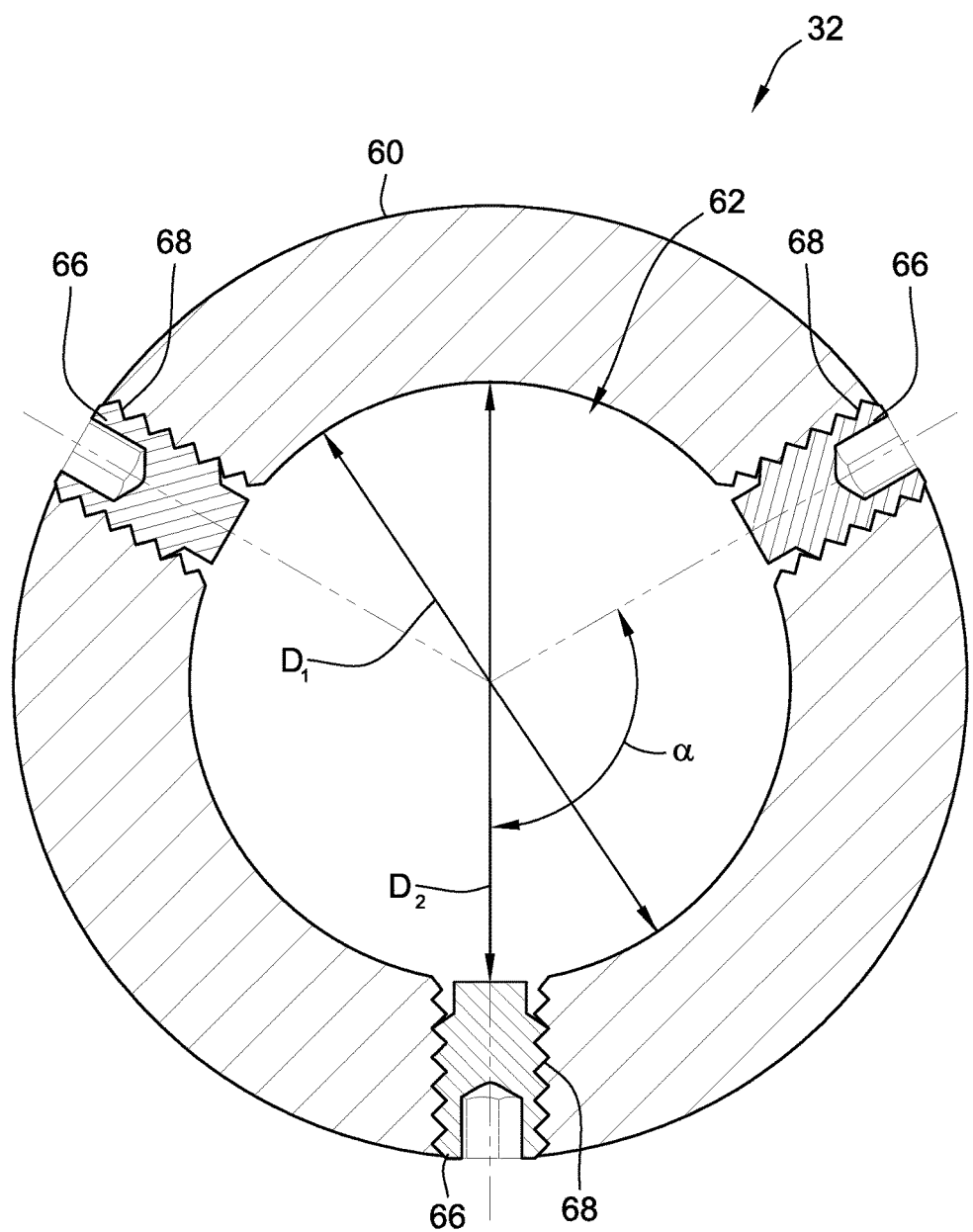
FIG. 5 is another cross section of the spacer shown in FIG. 2 taken along a plane perpendicular to the cross section of FIG. 3.

With reference to FIG. 5, the same illustrates another cross-section of spacer 32. This cross-section is taken through the plain which extends through the central axes of each of the plurality of adjustable members 66. As can be seen in this view, the adjustment members 66 are equally spaced at an angle α relative to one another. In the illustrated embodiment, there are three adjustment members, and thus angle α is 120°. As stated above, fewer or greater adjustment members 66 may be utilized, and their circumferential spacing may also be varied. In the illustrated embodiment, adjustment members 66 are set screws. As such, adjustment member bores 68 are threaded to accommodate the external threads of the set screws. The set screws are accessible from an exterior of body 60 of spacer 32 such that they may be readily moved into and out of bore 62 when spacer 32 is installed on shaft 48 of arbor 22. It is envisioned, however, that other types of adjustment members may be utilized. Indeed, instead of set screws, it is also conceivable to utilize pins or other members capable of the functionality described herein, or even other types of screws such as socket head cap screws, etc.

Figure 6:
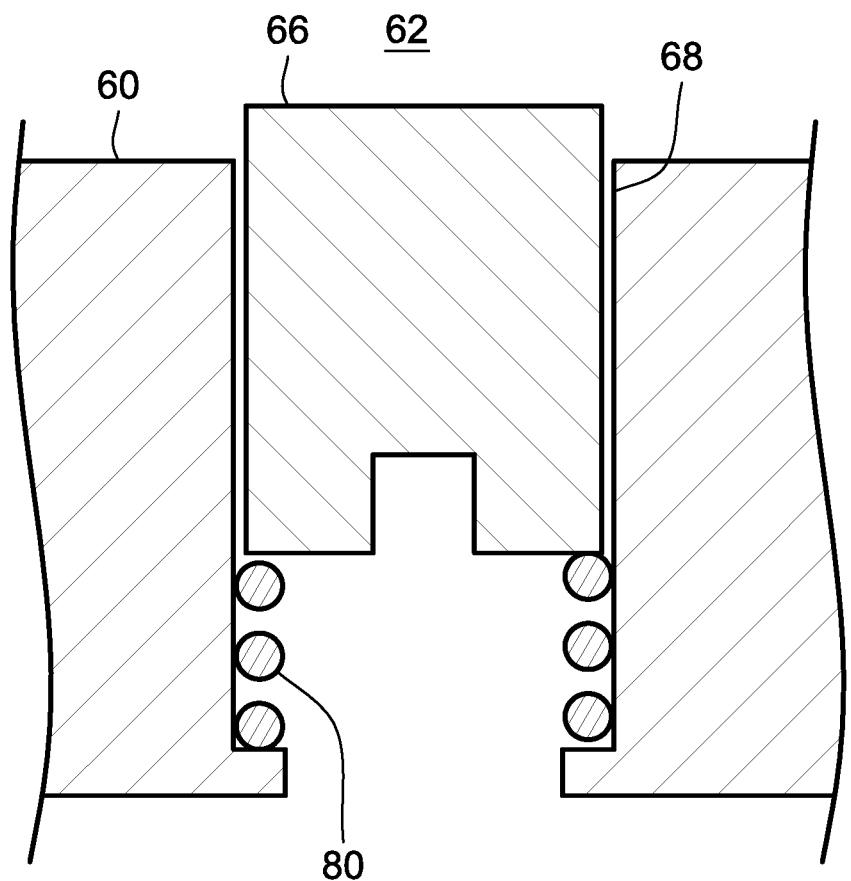
FIG. 6 is partial view of the cross section of FIG. 2, illustrating an alternative configuration which incorporates a biasing element.

With reference to FIG. 6, it is also contemplated that each adjustment bore 68 may also contain a biasing element 80 such as a spring to apply a biasing force against adjustment members 66. This biasing force is applied to prevent any unwanted movement of adjustment member 66 out of board 62, i.e. to reduce or prevent the likelihood of the adjustment member 66 backing out after being adjusted to their desired position.

Figure 7:
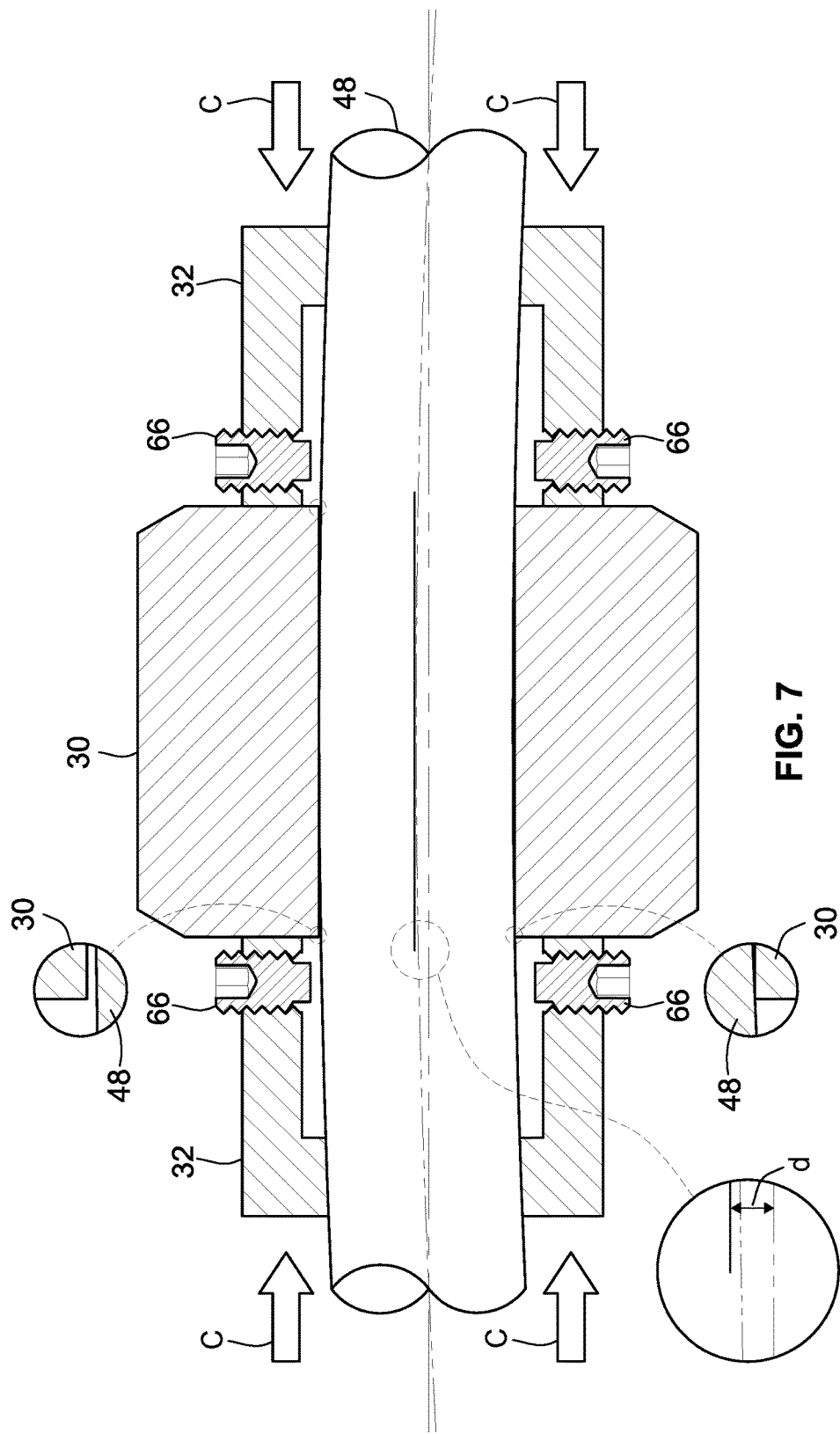
FIG. 7 is a multi-plane cross section of the spacer shown in FIG. 2 installed on an arbor.

Having described the structural configuration of spacer 32, as well as a gear hobbing machine 20 incorporating the same, an example is provided below of the adjustability of spacer 32. With reference to FIG. 7, spacers 32 are mounted on arbor shaft 48 on either side of a cutting tool in the form of hob 30. The cross section shown for each spacer 32 is a multi-plane cross section taken through two of the three adjustment members 66 shown in FIG. 2. Due to tensioning of the arbor shaft 48, and subsequent compression of spacers 32 and hob 30 as result of their abutment to one another and abutment with the structure arbor 48 mounts with, a compressive force F is applied against the ends of spacers 32 as shown. This force F causes a deflection d in arbor shaft 48. As result, hob 30 no longer resides within its desirable location along arbor 48, and thus, a run out condition is illustrated. More specifically, this run out condition results in an undesirable tilting of hob 30 such that its axial facing outer most surfaces no longer side in the theoretical plane which they should reside in.

Figure 8:
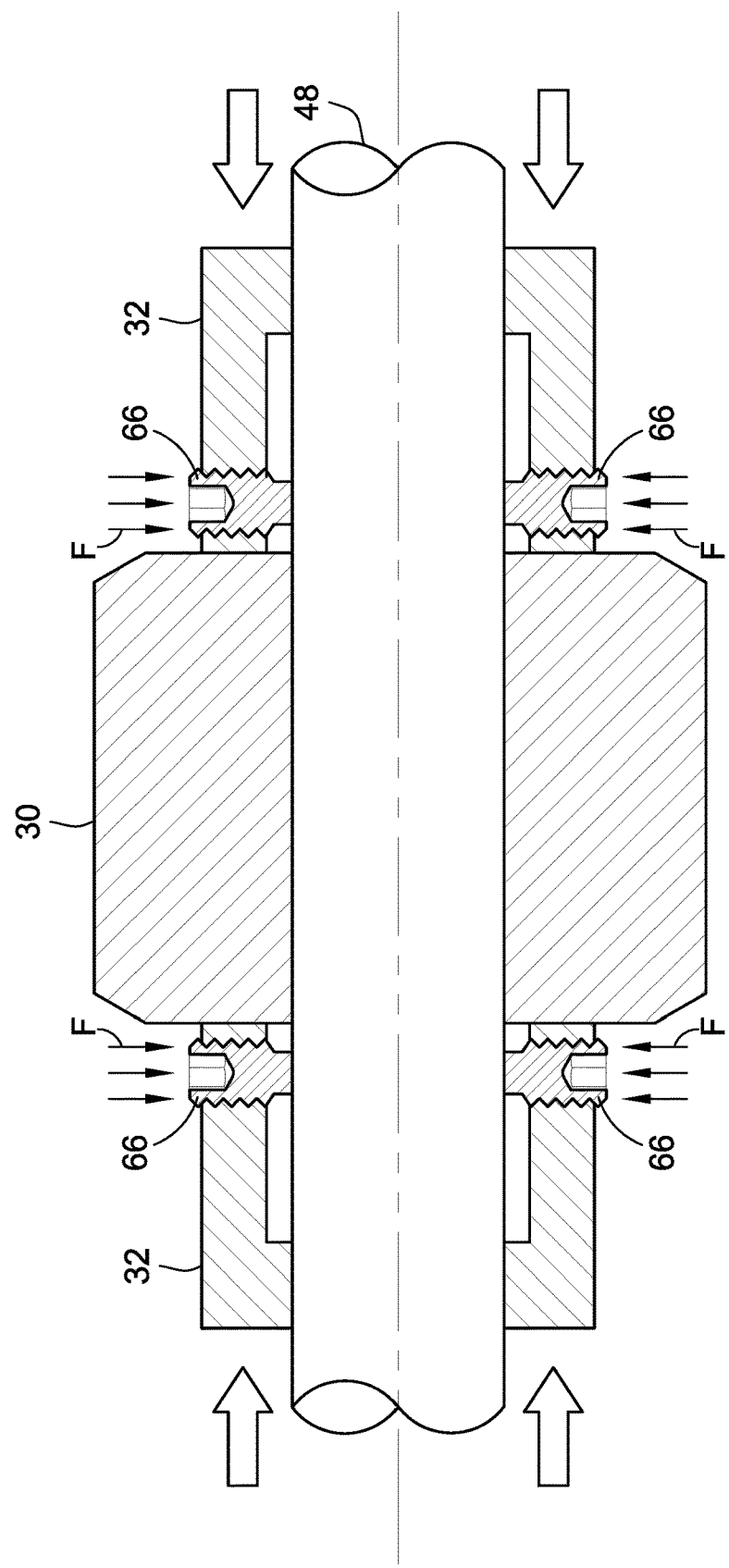
FIG. 8 is another cross section of the spacer shown in FIG. 2 installed on an arbor in an adjusted position relative to the position shown in FIG. 7.

Turning now to FIG. 8, to compensate for the above run out condition, one or more of adjustment members 66 may be adjusted on spacers 32 so as to provide a counter acting force F against arbor shaft 48. This in turn causes a counter acting deflection from the deflection d shown in FIG. 7, which ultimately reduces or eliminates the run out condition.

In a typically mode of operation, the spacer(s) 32 and hob 30 are installed on arbor 22. Once installed, arbor 22 is rotated about arbor axis 26. Simultaneously an indicator such as a dial indicator 52 as shown in FIG. 1 is ran along the upper axial surface 50 (See FIG. 1) of hob 30. This provides an indication of where, if any, deviations are present as a result of stack up, i.e. how "flat" the upper surface 50 is as it rotates. Rotation of arbor 22 is then stopped, and one or more of adjustment members 66 are adjusted. Arbor 22 may then be rotated again to confirm whether or not the aberrations have been corrected. This process may then be repeated to confirm a true correction has been achieved. During the above steps, it will be recognized that the adjustment members 66 of a given spacer 32 may be unequally adjusted, that is, some may not be adjusted at all, while others are significantly tightened/loosened to achieve an appropriate direction of the force vector applied by the spacer to counteract the deflection d.

Although not shown, it is also possible to use multiple indicators, e.g. one on the upper axial surface and one on the lower axial surface of hob 30. Also, as indicated above, this process is not limited to the particular gear hobbing configuration which is illustrated. The same process may be equally employed to any cutting tool mounted on an arbor.

With the above configuration and process, it is possible to rapidly reduce the time it takes to eliminate run out of a cutting tool mounted on an arbor. The above described spacers and associated process eliminate the need for the existing method of iteratively hammering spacers with a chisel as described above with prior methodologies. Thus, a significant time savings is achieved, as well as a far more reliable correction of run out conditions.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A spacer for an arbor of a machining system, the spacer comprising:
   a cylindrical body having a bore therethrough and defining an axis in an axial direction, wherein the bore has a first portion at a first diameter and a second portion at a second diameter less than the first diameter;
   a plurality of adjustment members extending through the cylindrical body and in communication with the bore, wherein each one of the plurality of adjustment members is movable in a radial direction;
   wherein the plurality of adjustment members are extendable into the first portion of the bore; and
   wherein the first portion has a first axial length and the second portion has a second axial length, the second axial length less than the first axial length.

2. The spacer of claim 1, wherein a step is formed between the first portion and the second portion.

3. The spacer of claim 1, wherein each one of the plurality of adjustment members is movable within an associated adjustment member bore.

4. The spacer of claim 3, wherein each adjustment member bore is threaded and wherein each adjustment member of the plurality of adjustment members is a threaded set screw.

5. A spacer for an arbor of a matching system, the spacer comprising:
   a cylindrical body having a bore therethrough and defining an axis in an axial direction, wherein the bore has a first portion at a first diameter and a second portion at a second diameter less than the first diameter;
   a plurality of adjustment members extending through the cylindrical body and in communication with the bore, wherein each one of the plurality of adjustment members is movable in a radial direction;
   wherein each one of the plurality of adjustment members is moveable within an associated adjustment member bore;
   wherein each adjustment member bore is threaded and wherein each adjustment member of the plurality of adjustment members is a threaded set screw; and
   wherein a biasing member is situated within each adjustment member bore and is arranged to bias the threaded set screw associated with the adjustment member bore.

6. The spacer of claim 1, wherein the plurality of adjustment members includes three adjustment members.

7. The spacer of claim 6, wherein the plurality of adjustment members are equally spaced in a circumferential direction of the spacer.

8. A spacer for an arbor of a matching system, the spacer comprising:
   a cylindrical body having a bore therethrough and defining an axis in an axial direction, wherein the bore has a first portion at a first diameter and a second portion at a second diameter less than the first diameter;
   a plurality of adjustment members extending through the cylindrical body and in communication with the bore, wherein each one of the plurality of adjustment members is movable in a radial direction; and
   wherein at least one of the plurality of adjustment members is axially spaced from remaining ones of the plurality of adjustment members.

9. A machining system, comprising:
   a frame;
   an arbor rotatably mounted to the frame, the arbor rotatable about an arbor axis;

a spindle rotatably mounted to the frame, the spindle rotatable about a spindle axis, the spindle axis transverse to the arbor axis;

at least one cutting tool mounted to the arbor; and at least one spacer mounted to the arbor, the at least one spacer comprising:

a cylindrical body having a bore extending through the body, the bore defining a spacer axis, wherein the bore has a first portion at a first diameter and a second portion at a second diameter less than the first diameter, and wherein the first portion has a first axial length and the second portion has a second axial length, the second axial length less than the first axial length; and a plurality of adjustment members carried by the body the plurality of adjustment members movable into and out of the first portion of the bore in a direction perpendicular to the spacer axis.

10. The machining system of claim 9, wherein the at least one spacer includes a plurality of spacers.

11. The machining system of claim 10, wherein the cutting tool is interposed on the arbor between two adjacent spacers.

12. The machining system of claim 10, wherein at least two spacers of the plurality of spacers have axial lengths which differ from one another.

13. The machining system of claim 9, wherein each one of the plurality of adjustment members is movable within an associated adjustment member bore.

14. The machining system of claim 13, wherein each adjustment member bore is threaded and wherein each adjustment member of the plurality of adjustment members is a threaded set screw.

15. A method for locating a cutting tool along an arbor of a machining system, the method comprising:

installing a cutting tool on the arbor;

installing at least one spacer on the arbor, the spacer including a bore and a plurality of adjustment members movable into and out of the bore, wherein the bore has a first portion at a first diameter and a second portion at a second diameter less than the first diameter, wherein the first portion has a first axial length and the second portion has a second axial length, the second axial length less than the first axial length, wherein the plurality of adjustment members are extendable into the first portion of the bore;

rotating the arbor and simultaneously contacting a surface of the cutting tool to provide a first dimensional indication of the cutting tool as it rotates with the arbor; and adjusting at least one of the plurality of adjustment members of the at least one spacer.

16. The method of claim 15, further comprising rotating the arbor and simultaneously contacting the surface of the cutting tool to provide a second dimensional indication of the cutting tool as it rotates with the arbor after adjusting the at least one of the plurality of adjustment members of the at least one spacer.

17. The method of claim 15, wherein adjusting at least one of the plurality of adjustment members includes adjusting each one of the plurality of adjustment members.

18. The method of claim 15, where adjusting includes a moving the at least one adjustment member in a radial direction which is normal to an axis defined by a bore extending through the at least one spacer.

* * * * *

UNITED STATES PATENT AND TRADEMARK OFFICE
CERTIFICATE OF CORRECTION

PATENT NO. : 10,265,777 B1  
APPLICATION NO. : 15/664865  
DATED : April 23, 2019  
INVENTOR(S) : Loyd L. Koch Page 1 of 1

It is certified that error appears in the above-identified patent and that said Letters Patent is hereby corrected as shown below:

In the Claims

Claim 8, Line 1 should read "machining" instead of "matching".

Signed and Sealed this
Tenth Day of September, 2019

Andrei Iancu
*Director of the United States Patent and Trademark Office*